US012061689B2

(12) United States Patent
Hoole et al.

(10) Patent No.: US 12,061,689 B2
(45) Date of Patent: Aug. 13, 2024

(54) PROVISIONING SYSTEM AND METHOD

(71) Applicant: Secure Thingz Ltd., Cambridge (GB)

(72) Inventors: Tim Hoole, Cambridgeshire (GB); Tim Woodruff, Cambridge (GB)

(73) Assignee: SECURE THINGZ LTD., Cambridge (GB)

( * ) Notice: Subject to any disclaimer, the term of this patent is extended or adjusted under 35 U.S.C. 154(b) by 246 days.

(21) Appl. No.: 17/524,960

(22) Filed: Nov. 12, 2021

(65) Prior Publication Data

US 2022/0156359 A1 May 19, 2022

(30) Foreign Application Priority Data

Nov. 13, 2020 (EP) .................................... 20207607

(51) Int. Cl.
*G06F 21/45* (2013.01)
*G06F 21/44* (2013.01)
*H04L 9/08* (2006.01)

(52) U.S. Cl.
CPC .............. *G06F 21/45* (2013.01); *G06F 21/44* (2013.01); *H04L 9/0825* (2013.01); *G06F 2221/2129* (2013.01); *G06F 2221/2135* (2013.01)

(58) Field of Classification Search
USPC .......................................................... 726/6
See application file for complete search history.

(56) References Cited

U.S. PATENT DOCUMENTS

| 11,063,599 | B2 | 7/2021 | Zuo et al. |
| 11,431,344 | B2 | 8/2022 | Zuo et al. |
| 2009/0300758 | A1* | 12/2009 | Hauck ................... H04L 9/3271 380/283 |

(Continued)

FOREIGN PATENT DOCUMENTS

| TW | 202034179 A | 9/2020 |
| TW | 202040305 A | 11/2020 |

OTHER PUBLICATIONS

Extended Search Report from corresponding EP Application No. 20207607.1, Mar. 15, 2021.

(Continued)

*Primary Examiner* — Brandon Hoffman
(74) *Attorney, Agent, or Firm* — Workman Nydegger

(57) ABSTRACT

A provisioning system is provided for provisioning a plurality of electronic devices with provisioning data. Each of the plurality of electronic devices is associated with an electronic device type. The provisioning system includes a provisioning control apparatus, and a provisioning equipment configured to be electrically connected with at least one of the plurality of electronic devices for provisioning the at least one electronic device. The provisioning system includes a provisioning security module configured to receive the device type information from the provisioning control apparatus and to generate provisioning data on the basis of the device type information. The provisioning security module transmits the provisioning data to the provisioning equipment for provisioning the at least one electronic device with provisioning data. The provisioning security module maintains a provisioning counter indicative of a remaining number of the plurality of electronic devices that can be provisioned with provisioning data.

12 Claims, 4 Drawing Sheets

(56) References Cited

U.S. PATENT DOCUMENTS

| | | | |
|---|---|---|---|
| 2018/0375666 A1* | 12/2018 | Gulati | G09C 1/00 |
| 2019/0349426 A1 | 11/2019 | Smith et al. | |
| 2020/0272745 A1* | 8/2020 | Bott | H04L 9/3247 |
| 2020/0343898 A1 | 10/2020 | Zuo et al. | |
| 2020/0348977 A1 | 11/2020 | Yi et al. | |
| 2021/0313995 A1 | 10/2021 | Zuo et al. | |

OTHER PUBLICATIONS

Office Action from corresponding Taiwanese Application No. 11120935120, Sep. 22, 2022.

* cited by examiner

PROVISIONING SYSTEM AND METHOD

TECHNICAL FIELD

The invention relates to the secure production and provisioning of electronic devices. More specifically, the invention relates to a system and method for provisioning electronic devices.

BACKGROUND OF THE INVENTION

The production and assembly of state-of-the-art electronic consumer equipment, such as smartphones, tablet computers as well as other types of IoT devices, often happens in a distributed fashion in that the various electronic components or devices, including the electronic chips or microprocessors of the electronic consumer equipment are manufactured, provisioned or personalized and finally assembled at different locations and by different parties. For instance, an electronic chip or microprocessor for an electronic consumer equipment may be originally manufactured by a chip manufacturer and provisioned by another party with a suitable firmware, before being assembled into the final end product by the manufacturer of the electronic consumer equipment, e.g. an OEM.

For such distributed processing chains of electronic equipment there is a need for systems and methods allowing for a secure and controlled provisioning of electronic components or devices, such as chips or microprocessors of the electronic equipment.

SUMMARY OF THE INVENTION

It is therefore an object of the invention to provide systems and methods allowing for a secure and controlled provisioning of electronic devices, such as chips or microprocessors for electronic equipment.

The foregoing and other objects are achieved by the subject matter of the independent claims. Further implementation forms are apparent from the dependent claims, the description and the figures.

According to a first aspect a production provisioning system is provided for provisioning a plurality of electronic devices with provisioning data, wherein each of the plurality of electronic devices is associated with an electronic device type, such as an electronic chip or processor of a certain type. The plurality of electronic devices may comprise chips, microprocessors or other programmable electronic devices, such as Flash memories, electrically erasable programmable read only memories (EEPROM), programmable logic devices (PLDs), field programmable gate arrays (FPGAs), or microcontrollers incorporating non-volatile memory elements or Physical Unclonable Functions (PUFs). The provisioning data may include a plurality of data elements, such as personalized cryptographic keys, a firmware, a software application or another type of program code. The respective provisioning data may be digitally signed.

The provisioning system comprises a provisioning control apparatus configured to obtain device type information about the respective electronic device type of the plurality of electronic devices. Moreover, the provisioning system comprises a provisioning equipment configured to be electrically connected at a time with at least one of the plurality of electronic devices for provisioning the at least one electronic device. The provisioning system further comprises a provisioning security module configured to receive the device type information from the provisioning control apparatus and to generate provisioning data on the basis of the device type information, wherein the provisioning security module is further configured to transmit the provisioning data via the provisioning control apparatus to the provisioning equipment for provisioning the at least one electronic device with provisioning data.

The provisioning security module is further configured to maintain a provisioning counter indicative of a remaining number of the plurality of electronic devices that can be provisioned with provisioning data.

In a further embodiment, the provisioning security module is further configured to update the provisioning counter for each provisioned electronic device of the plurality of electronic devices to obtain an updated provisioning counter.

In a further embodiment, the provisioning security module is configured to update the provisioning counter for each provisioned electronic device of the plurality of electronic devices by decrementing or incrementing the provisioning counter for each provisioned electronic device of the plurality of electronic devices to obtain the updated provisioning counter.

In a further embodiment, the provisioning security module is further configured to block provisioning of a further electronic device of the plurality of electronic devices, if the updated provisioning counter indicates that the remaining number of the plurality of electronic devices that can be provisioned has been reached.

In a further embodiment, the provisioning data comprises at least a first portion and a second portion, wherein the provisioning control apparatus is configured to forward the first portion of the provisioning data to the provisioning equipment for providing the first portion of the provisioning data to the at least one electronic device and wait for the provisioning equipment to provide the first portion of the provisioning data to the at least one electronic device before forwarding the second portion of the provisioning data to the provisioning equipment for providing the second portion of the provisioning data to the at least one electronic device.

In a further embodiment, the provisioning equipment is further configured to determine the electronic device type of the respective electronic device of the plurality of electronic devices and to transmit the device type information to the provisioning control apparatus.

In a further embodiment, the provisioning data comprises at least one of a unique identifier for the at least one electronic device, one or more cryptographic keys, one or more rules for operating and/or updating the at least one electronic device.

In a further embodiment, the provisioning control apparatus is configured to obtain the device type information about the respective electronic device type of the plurality of electronic devices, in response to receiving a provisioning request for provisioning the plurality of electronic devices.

In a further embodiment, the provisioning system further comprises a remote OEM server, wherein the provisioning control apparatus is configured to receive the provisioning request for provisioning the plurality of electronic devices from the remote OEM server.

In a further embodiment, the provisioning request for provisioning the plurality of electronic devices comprises an electronic token, wherein the provisioning control apparatus is configured to forward the electronic token to the provisioning security module and wherein the electronic token comprises information indicative of a maximum number of the plurality of electronic devices that can be provisioned with provisioning data.

In a further embodiment, the electronic token further comprises data defining one or more validity time periods of the electronic token, wherein the security provisioning module is further configured to block provisioning of a further electronic device of the plurality of electronic devices outside of the one or more validity time periods. In an embodiment, the one or more validity time periods may comprise a time period by when the electronic token has to be used for the first time for provisioning an electronic device (i.e. a validity period for the token acceptance). In a further embodiment, the one or more validity time periods may comprise a time period defining up to when the electronic token can be used for provisioning electronic devices (i.e. an expiry period of the electronic token).

In a further embodiment, the electronic token further comprises a token identifier for identifying the electronic token, wherein the security provisioning module is further configured to store the token identifier in a list of electronic tokens already used or in use.

In a further embodiment, the security provisioning module is configured to receive the electronic token in encrypted form, wherein the security provisioning module is further configured to decrypt the encrypted electronic token.

In a further embodiment, the electronic token comprises a digital signature based on a private key of a token generator server, wherein the security provisioning module is configured to verify the digital signature of the electronic token using a public key of the token generator server.

According to a second aspect a method for provisioning a plurality of electronic devices with provisioning data is provided, wherein each of the plurality of electronic devices is associated with an electronic device type, such as an electronic chip or processor of a certain type. The method comprises the steps of:

obtaining by a provisioning control apparatus device type information about the respective electronic device type of the plurality of electronic devices;

receiving by a provisioning security module the device type information from the provisioning control apparatus;

generating by the provisioning security module provisioning data on the basis of the device type information;

transmitting by the provisioning security module the provisioning data via the provisioning control apparatus to a provisioning equipment configured to be electrically connected with at least one of the plurality of electronic devices for provisioning the at least one electronic device with provisioning data; and maintaining by the provisioning security module a provisioning counter indicative of a remaining number of the plurality of electronic devices that can be provisioned with provisioning data.

The provisioning method according to the second aspect of the invention can be performed by the provisioning system according to the first aspect of the invention. Further features of the provisioning method according to the second aspect of the invention result directly from the functionality of the provisioning system according to the first aspect of the invention and its different implementation forms described above and below.

Embodiments of the invention can be implemented in hardware and/or software.

BRIEF DESCRIPTION OF THE DRAWINGS

Further embodiments of the invention will be described with respect to the following figures, wherein.

In the figures, identical reference signs will be used for identical or at least functionally equivalent features.

DETAILED DESCRIPTION OF EMBODIMENTS

In the following detailed description, reference is made to the accompanying drawings, which form part of the disclosure, and in which are shown, by way of illustration, specific aspects in which the present invention may be implemented. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
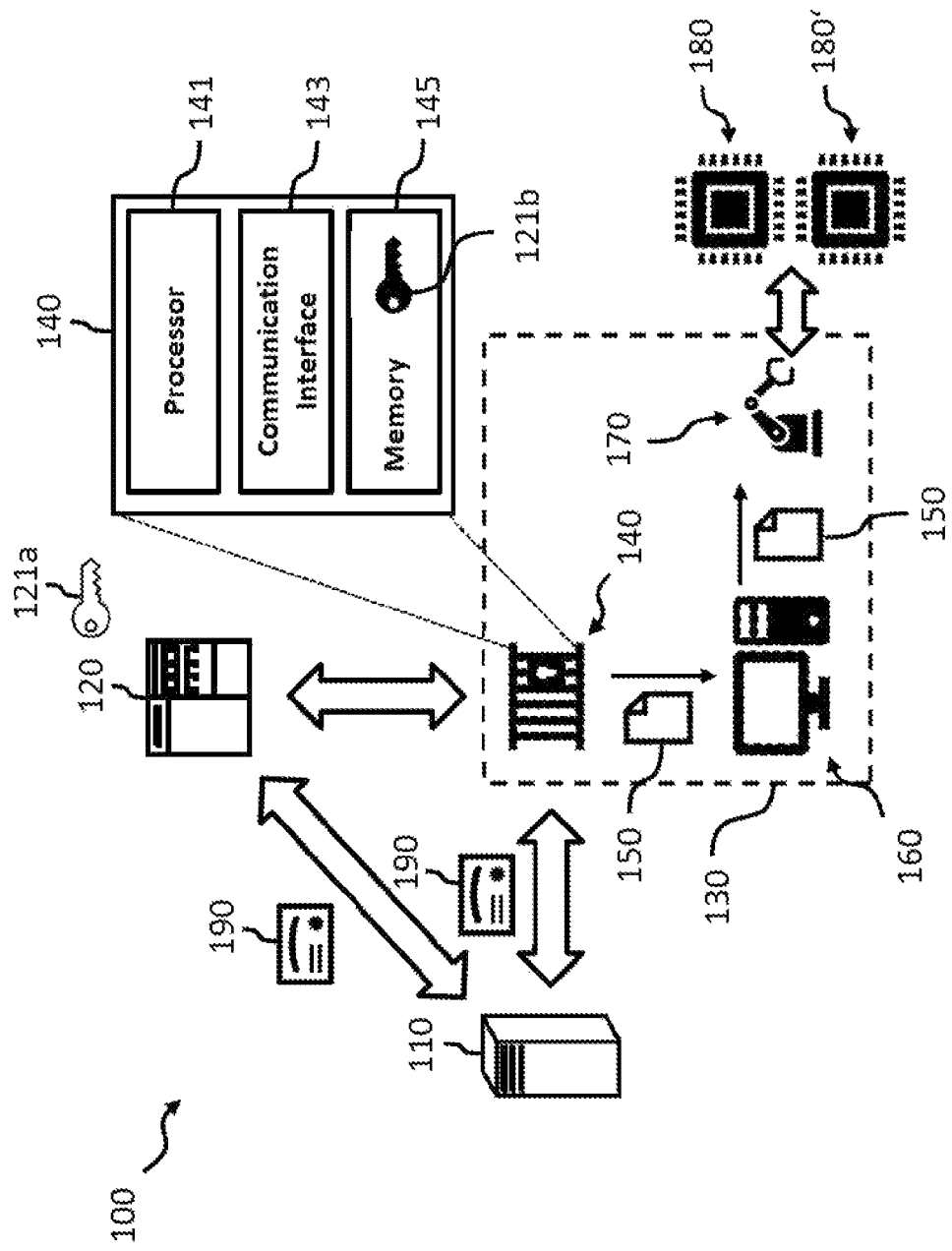
FIG. 1 shows a schematic diagram illustrating a provisioning system according to an embodiment of the invention.

FIG. 1 shows a schematic diagram of a system 100 according to an embodiment of the invention, including a provisioning system 130 according to an embodiment of the invention for provisioning or personalizing a plurality of electronic devices 180, 180' such as chips or microprocessors 180, 180' with provisioning data 150, wherein each of the plurality of electronic devices 180, 180' is associated with an electronic device type. In an embodiment, the provisioning data 150 may comprise an unique identifier for the at least one electronic device 180, 180', one or more cryptographic keys, one or more rules for operating and/or updating the at least one electronic device 180, 180' and/or a firmware for the electronic device 180, 180'.

As illustrated in FIG. 1, the provisioning system 130 comprises a provisioning control apparatus 160 configured to obtain device type information about the respective electronic device type of the plurality of electronic devices 180, 180'. Moreover, the provisioning system 130 comprises a provisioning equipment 170 configured to be electrically connected with at a time at least one of the plurality of electronic devices 180, 180' for provisioning the at least one electronic device 180, 180'. In an embodiment, the provisioning equipment 170 is configured to determine the electronic device type of the plurality of electronic devices 180, 180' and to transmit the device type information to the provisioning control apparatus 160.

The provisioning system 130 further comprises a provisioning security module 140 configured to receive the device type information from the provisioning control apparatus 160 and to generate provisioning data 150 on the basis of the device type information. In other words, depending on the type of the electronic device 180, 180' to be provisioning the provisioning security module 140 may generate different provisioning data 150.

The provisioning security module 140 is further configured to transmit the provisioning data 150 generated on the basis of the electronic device type information via the provisioning control apparatus 160 to the provisioning equipment 170 for provisioning the at least one electronic device 180, 180' with the provisioning data 150. The provisioning security module 140 is further configured to maintain a provisioning counter indicative of a remaining number of the plurality of electronic devices 180, 180' that can be provisioned with provisioning data 150.

As will be described in more detail further below, the system 100 may comprise in addition to the provisioning system 130 a remote OEM server 110 and a token generator server 120. As illustrated in FIG. 1, the provisioning system 130, the remote server 110 and the token generator server 120 may be configured to communicate with each other via a communication network, such as the Internet. Thus, the provisioning system 130, the remote server 110 and the token generator server 120 may be at different locations and under the control of different parties. In an embodiment, the remote server 110 may be under the control or associated with an electronic equipment manufacturer, e.g. an OEM, wherein the electronic equipment manufacturer assembles electronic equipment, such as smart phones, tablet computers or other types of IoT or electronic consumer equipment, using the electronic devices 180, 180' provisioned by the provisioning system 130 with the provisioning data 150. In an embodiment, the provisioning data 150 may comprise a firmware of the electronic equipment manufacturer associated with the remote server 110. Advantageously, this allows the electronic equipment manufacturer to have control over the provisioning of the electronic devices 180, 180' with its firmware.

In an embodiment, the provisioning system 130, the remote server 110 and the token generator server 120 are configured to securely communicate with each other using one or more cryptographic schemes, such as a public key infrastructure and/or a hybrid cryptographic scheme.

In an embodiment, the provisioning security module 140 is configured to be coupled to the provisioning control apparatus 160, for instance, by a wired or a wireless connection. In an embodiment, the provisioning control apparatus 160 may be implemented as a personal computer and the provisioning security module 140 may be implemented as a PC card inserted in the provisioning control apparatus 160. The provisioning equipment 170 may comprise an electrical and/or mechanical interface for interacting directly or indirectly with one or more of the plurality of electronic devices 180, 180'. For instance, the provisioning equipment 170 may comprise a personalization tray for personalizing a batch of electronic devices 180, 180' inserted therein.

In an embodiment, the provisioning security module 140 is configured to update the provisioning counter for each provisioned electronic device of the plurality of electronic devices 180, 180' to obtain an updated provisioning counter. For instance, the provisioning security module 140 may be configured to update the provisioning counter for each provisioned electronic device of the plurality of electronic devices 180, 180' by decrementing the provisioning counter for each provisioned electronic device of the plurality of electronic devices 180, 180' to obtain the updated provisioning counter. In another embodiment, the provisioning counter may be incremented until the maximum number of allowed electronic devices 180, 180' have been provisioned. The provisioning security module 140 may be further configured to block provisioning of a further electronic device of the plurality of electronic devices 180, 180', if the updated provisioning counter indicates that the remaining number of the plurality of electronic devices 180, 180' that can be provisioned has been reached, e.g. if the updated provisioning counter is equal to zero (in case of decrementing the provisioning counter for each device) or equal to the maximum number of allowed electronic devices 180, 180' (in case of incrementing the provisioning counter for each device). In other words, once the total number of electronic devices 180, 180' have been provisioned, the provisioning security module 140 will prevent the provisioning of any further electronic devices 180, 180' with the provisioning data 150 by the provision equipment 170.

In an embodiment, the provisioning control apparatus 160 is configured to obtain the device type information about the respective electronic device type of the plurality of electronic devices 180, 180', in response to receiving a provisioning request for provisioning the plurality of electronic devices 180, 180'. In an embodiment, the provisioning control apparatus 160 is configured to receive the provisioning request for provisioning the plurality of electronic devices 180, 180' from the remote OEM server 110.

Figure 2:
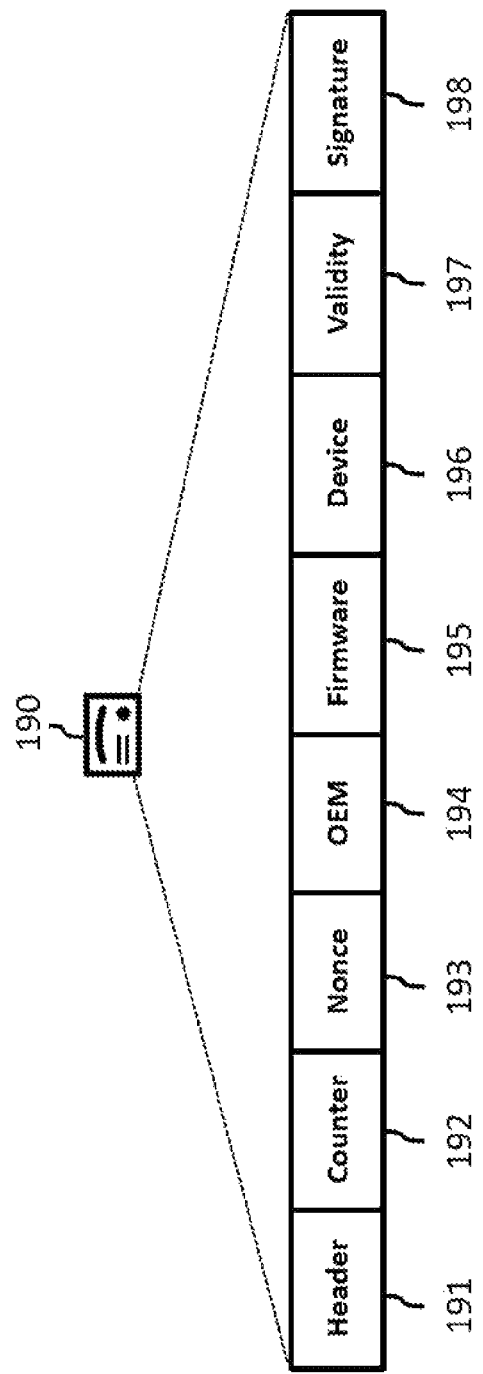
FIG. 2 shows a schematic diagram illustrating an exemplary electronic token used by the provisioning system of FIG. 1.

In an embodiment, the provisioning request for provisioning the plurality of electronic devices 180, 180' comprises an electronic token 190, wherein the provisioning control apparatus 160 is configured to forward the electronic token 190 to the provisioning security module 140 and wherein the electronic token 190 comprises information 192, as illustrated in FIG. 2, indicative of a maximum number of the plurality of electronic devices 180, 180' that can be provisioned by the provisioning equipment 170 with the provisioning data 150. In an embodiment, the security provisioning module 140 is configured to receive the electronic token 190 in encrypted form, wherein the security provisioning module 140 is further configured to decrypt the encrypted electronic token 190. In an embodiment, the electronic token 190 comprises a digital signature 198 (see FIG. 2) based on a private key 121a of the token generator server 120, wherein the security provisioning module 140 is configured to verify the digital signature 198 of the electronic token 190 using a public key 121b of the token generator server 120.

As illustrated in FIG. 2, the electronic token 190 may further comprise data 197 defining one or more validity time periods of the electronic token 190, wherein the security provisioning module 140 is further configured to block provisioning of a further electronic device of the plurality of electronic devices 180, 180' outside of the one or more validity time periods. In an embodiment, the one or more validity time periods may comprise a time period by when the electronic token 190 has to be used for the first time for provisioning an electronic device 180, 180' (i.e. a validity period for the token acceptance). In a further embodiment, the one or more validity time periods may comprise a time period defining up to when the electronic token 190 can be used for provisioning electronic devices 180, 180' (i.e. an expiry period of the electronic token 190).

In the embodiment shown in FIG. 2, the electronic token 190 further comprises a token identifier 193 for identifying the electronic token 190, wherein the security provisioning module 140 is further configured to store the token identifier 193 in a list of electronic tokens already used or in use in order to prevent replay attacks. In an embodiment, the token identifier 193 may be a nonce 193.

As illustrated in FIG. 2, the electronic token 190 may comprise further data, such as provisioning control data 191 for controlling communications between the security provisioning module 140 and the provisioning control apparatus 160. In an embodiment, these provisioning control data 191 may be provided in a header 191 of the electronic token 190. In an embodiment, the provisioning control data 191 may identify a secure communication protocol for securing the communication between the security provisioning module 140 and the provisioning control apparatus 160. As illustrated in FIG. 2, the electronic token 190 may further comprise an OEM identifier 194, a firmware identifier 195, an electronic device type identifier 196.

Figure 3:
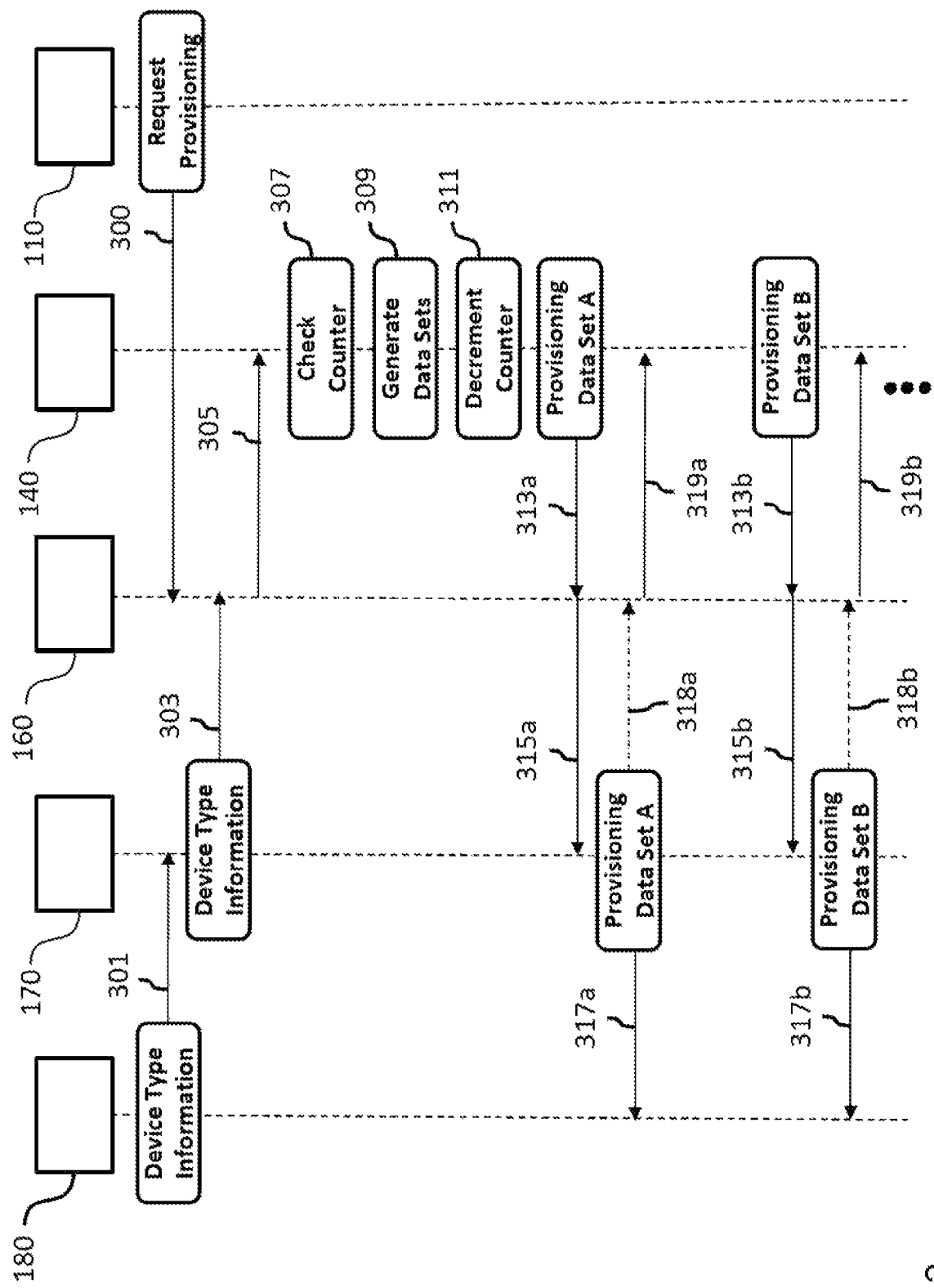
FIG. 3 shows a signaling diagram illustrating the interaction of several components of the provisioning system of FIG. 1.

FIG. 3 shows a signaling diagram illustrating the interaction of the components of the provisioning system 130 and the electronic device(s) 180, 180' to be provisioned. In FIG. 3 the following steps are illustrated, some of which already have been described in the context of FIGS. 1 and 2 above.

In step 300 of FIG. 3, the provisioning control apparatus 160 receives a request for provisioning one or more of the plurality of electronic devices 180, 180'. As already described above, in an embodiment, this request may be issued by the remote OEM server 110 and may comprise the electronic token 190.

In step 301 of FIG. 3, the provisioning equipment 170 obtains information about electronic device type of the currently to be provisioned electronic device(s) 180, 180', such as the electronic device(s) currently inserted into a personalization tray of the provisioning equipment 170.

In steps 303 and 305 of FIG. 3, the provisioning equipment 170 forwards the device type information to the provisioning control apparatus 160, which, in turn, relays the device type information to the security provisioning module 140.

In step 307 of FIG. 3, the security provisioning module 140 checks whether the current value of the electronic provisioning counter allows provisioning of a further electronic device 180, 180'. If this is the case, the security provisioning module 140 generates the provisioning data 150 (step 309) and decrements the electronic provisioning counter (step 311). In the embodiment shown in FIG. 3, the provisioning data 150 comprises a plurality of data sets or chunks, including at least a first data set and a second data set.

In step 313a of FIG. 3, the security provisioning module 140 forwards the first data set (Data Set A) of the provisioning data 150 to the provisioning control apparatus 160, which, in turn, relays the first data set (Data Set A) of the provisioning data 150 to the provisioning equipment 170 (step 315a).

In step 317a of FIG. 3, the provisioning equipment 170 writes the first data set of the provisioning data 150 to the electronic device 180, 180', such as to a memory of the electronic device 180, 180' (as will be appreciated, in an embodiment, where the provisioning data 150 only includes a first data set generated in step 309, the provisioning would be complete with step 317a of FIG. 3). In parallel to or after writing the first data set (Data Set A) of the provisioning data 150 to the electronic device 180, 180', the provisioning equipment 170 may send an acknowledgement message to the provisioning control apparatus 160 (step 318a), which, in turn, relays the acknowledgement message to the security provisioning module 140 for requesting a further data set of the provisioning data 150 (step 319a).

In step 313b of FIG. 3, in response to receiving the acknowledgement message from the provisioning control apparatus 160, the security provisioning module 140 forwards the next portion, e.g. the second data set (Data Set B) of the provisioning data 150 to the provisioning control apparatus 160, which, in turn, relays the second data set (Data Set B) of the provisioning data 150 to the provisioning equipment 170 (step 315b).

The further steps 317b, 318b and 319b are identical to the steps 317a, 318a and 319a already described above. The sequence of steps 313a-319a will be repeated until all of the data sets making up the provisioning data 150 have been provided to the currently provisioned electronic device 180, 180'. Once this has been completed, the next electronic device 180, 180' or batch of electronic devices 180, 180' may be provisioned in the way illustrated in FIG. 3.

Figure 4:
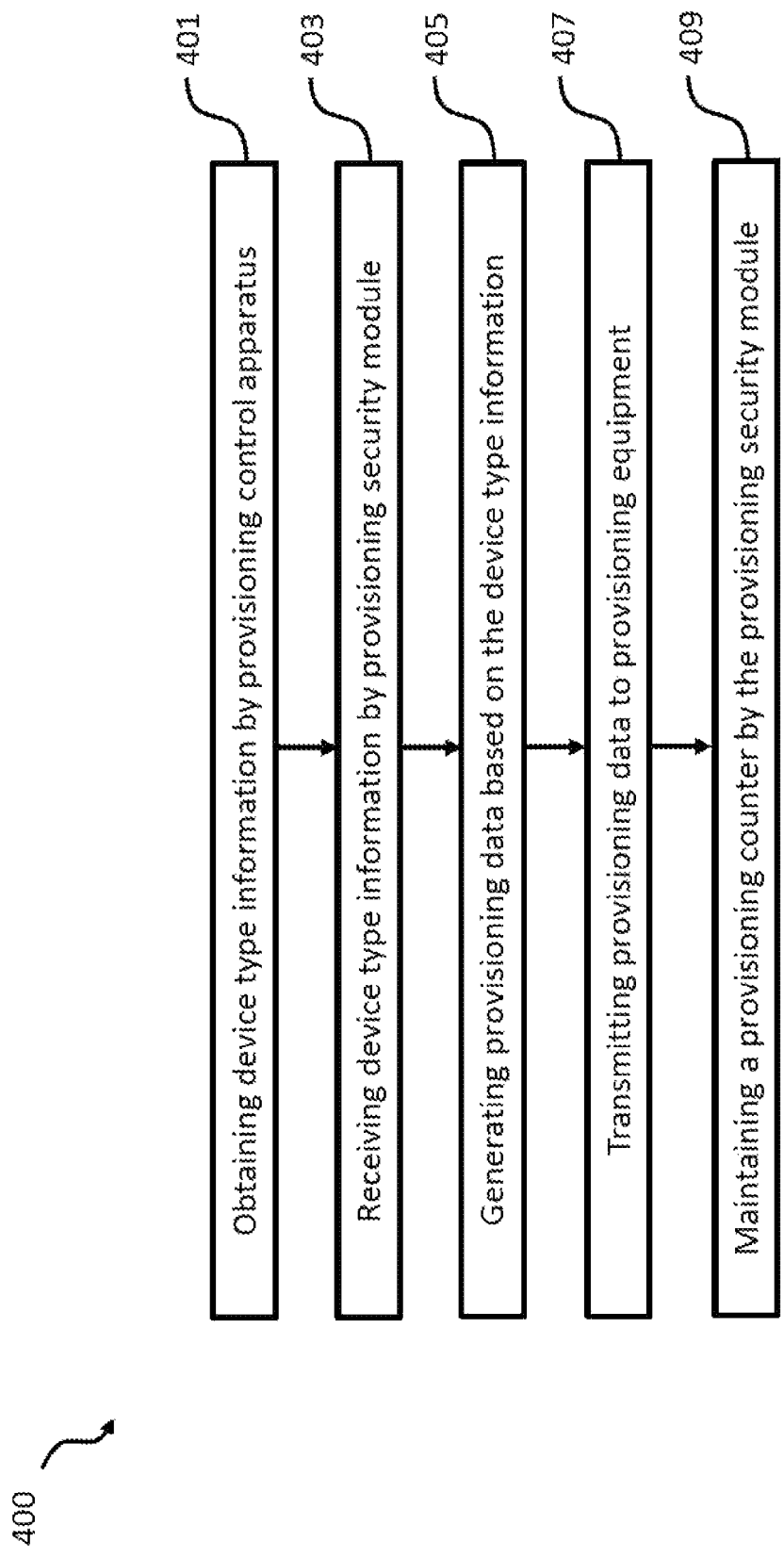
FIG. 4 shows a flow diagram illustrating steps of a provisioning method according to an embodiment of the invention.

FIG. 4 shows a flow diagram illustrating steps of a correspond provisioning method 400 according to an embodiment of the invention. The provisioning method 400 according to an embodiment of the invention comprises the following steps:

Step 401: obtaining by the provisioning control apparatus 160 device type information about the respective electronic device type of the plurality of electronic devices 180, 180'.

Step 403: receiving by the provisioning security module 140 the device type information from the provisioning control apparatus 160.

Step 405: generating by the provisioning security module 140 provisioning data 150 on the basis of the device type information.

Step 407: transmitting by the provisioning security module 140 the provisioning data 150 via the provisioning control apparatus 160 to the provisioning equipment 170 configured to be electrically connected with at least one of the plurality of electronic devices 180, 180' for provisioning the at least one electronic device 180, 180' with the provisioning data 150.

Step 409: maintaining by the provisioning security module 140 a provisioning counter indicative of a remaining number of the plurality of electronic devices 180, 180' that can be provisioned with provisioning data 150.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application.

Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A provisioning system for provisioning a plurality of electronic devices with provisioning data, each of the plurality of electronic devices being associated with an electronic device type, wherein the production provisioning system comprises:
   a remote server;
   a provisioning control apparatus configured to obtain device type information about the electronic device type of the plurality of electronic devices, in response to receiving a provisioning request for provisioning the plurality of electronic devices from the remote server;
   a provisioning equipment configured to be electrically connected with at least one of the plurality of electronic devices for provisioning the at least one electronic device; and
   a provisioning security module configured to receive the device type information from the provisioning control apparatus and to generate provisioning data on the basis of the device type information, wherein the provisioning security module is further configured to transmit the provisioning data via the provisioning control apparatus to the provisioning equipment for provisioning the at least one electronic device with provisioning data;
   wherein the provisioning security module is further configured to maintain a provisioning counter indicative of a remaining number of the plurality of electronic devices that can be provisioned with provisioning data,
   wherein the provisioning request for provisioning the plurality of electronic devices comprises an electronic token and wherein the provisioning control apparatus is configured to forward the electronic token to the provisioning security module, wherein the electronic token comprises information indicative of a maximum number of the plurality of electronic devices that can be provisioned with provisioning data, and
   wherein the electronic token comprises provisioning control data for controlling communications between the provisioning security module and the provisioning apparatus.

2. The provisioning system of claim 1, wherein the provisioning security module is further configured to update the provisioning counter for each provisioned electronic device of the plurality of electronic devices to obtain an updated provisioning counter.

3. The provisioning system of claim 2, wherein the provisioning security module is configured to update the provisioning counter for each provisioned electronic device of the plurality of electronic devices by decrementing or incrementing the provisioning counter for each provisioned electronic device of the plurality of electronic devices to obtain the updated provisioning counter.

4. The provisioning system of claim 1, wherein the provisioning security module is further configured to block provisioning of a further electronic device of the plurality of electronic devices, if the updated provisioning counter indicates that the remaining number of the plurality of electronic devices that can be provisioned has been reached.

5. The provisioning system of claim 1, wherein the provisioning data comprises at least a first portion and a second portion, wherein the provisioning control apparatus is configured to forward the first portion of the provisioning data to the provisioning equipment for providing the first portion of the provisioning data to the at least one electronic device and wait for the provisioning equipment to provide the first portion of the provisioning data to the at least one electronic device before forwarding the second portion of the provisioning data to the provisioning equipment for providing the second portion of the provisioning data to the at least one electronic device.

6. The provisioning system of claim 1, wherein the provisioning equipment is further configured to determine the electronic device type of the plurality of electronic devices and to transmit the device type information to the provisioning control apparatus.

7. The provisioning system of claim 1, wherein the provisioning data comprises at least one of an identifier for the at least one electronic device, one or more cryptographic keys, one or more rules for operating and/or updating the at least one electronic device.

8. The provisioning system of claim 1, wherein the electronic token further comprises data defining one or more validity time periods of the electronic token and wherein the security provisioning module is further configured to block provisioning of a further electronic device of the plurality of electronic devices outside of the one or more validity time periods.

9. The provisioning system of claim 1, wherein the electronic token further comprises a token identifier for identifying the electronic token and wherein the security provisioning module is further configured to store the token identifier in a list of electronic tokens already used or in use.

10. The provisioning system of claim 1, wherein the security provisioning module is configured to receive the electronic token in encrypted form and wherein the security provisioning module is further configured to decrypt the encrypted electronic token.

11. The provisioning system of claim 1, wherein the electronic token comprises a digital signature based on a private key of a token generator server and wherein the security provisioning module is configured to verify the digital signature of the electronic token using a public key of the token generator server.

12. A method for provisioning a plurality of electronic devices with provisioning data, each of the plurality of electronic devices being associated with an electronic device type, wherein the method comprises:
   obtaining by a provisioning control apparatus device type information about the electronic device type of the plurality of electronic devices, in response to receiving a provisioning request for provisioning the plurality of electronic devices from a remote server, wherein the provisioning request for provisioning the plurality of electronic devices comprises an electronic token, wherein the electronic token comprises information indicative of a maximum number of the plurality of electronic devices that can be provisioned with provisioning data, wherein the electronic token comprises provisioning control data for controlling communications between a provisioning security module and the provisioning apparatus;

forwarding the electronic token to the provisioning security module by the provisioning control apparatus;

receiving by the provisioning security module the device type information from the provisioning control apparatus;

generating by the provisioning security module provisioning data on the basis of the device type information;

transmitting by the provisioning security module the provisioning data via the provisioning control apparatus to a provisioning equipment configured to be electrically connected with at least one of the plurality of electronic devices for provisioning the at least one electronic device with provisioning data; and maintaining by the provisioning security module a provisioning counter indicative of a remaining number of the plurality of electronic devices that can be provisioned with provisioning data.

* * * * *